US008218107B2

(12) United States Patent
Son et al.

(10) Patent No.: US 8,218,107 B2
(45) Date of Patent: Jul. 10, 2012

(54) BACKLIGHT UNIT AND LIQUID CRYSTAL DISPLAY DEVICE INCLUDING THE SAME

(75) Inventors: Seung-Woo Son, Paju-si (KR); Ji-Woon Min, Busan (KR)

(73) Assignee: LG Display Co., Ltd., Seoul (KR)

( * ) Notice: Subject to any disclaimer, the term of this patent is extended or adjusted under 35 U.S.C. 154(b) by 475 days.

(21) Appl. No.: 12/292,850

(22) Filed: Nov. 26, 2008

(65) Prior Publication Data
US 2009/0268126 A1 Oct. 29, 2009

(30) Foreign Application Priority Data

Apr. 28, 2008 (KR) .................. 10-2008-0039274

(51) Int. Cl.
*G02F 1/1335* (2006.01)
*G09F 13/04* (2006.01)
(52) U.S. Cl. ........................ 349/70; 349/64; 362/97.2
(58) Field of Classification Search ........ 362/97.1–97.3; 349/70, 67, 64
See application file for complete search history.

(56) References Cited

U.S. PATENT DOCUMENTS

| 7,677,757 | B2 * | 3/2010 | Takata et al. .................. 362/225 |
| 2007/0058397 | A1 * | 3/2007 | Aoki et al. .................. 362/655 |
| 2007/0070651 | A1 * | 3/2007 | Azuma et al. ................ 362/655 |
| 2009/0154140 | A1 * | 6/2009 | Aoki et al. .................. 362/97.2 |

FOREIGN PATENT DOCUMENTS

| WO | WO 2006059411 A1 * | 6/2006 |
| WO | WO 2006059463 A1 * | 6/2006 |

* cited by examiner

*Primary Examiner* — Mark Robinson
*Assistant Examiner* — Michael Inadomi
(74) *Attorney, Agent, or Firm* — McKenna, Long and Aldridge, LLP.

(57) ABSTRACT

A lamp guide includes: a horizontal part; at least one supporting part extending from a front surface of the horizontal part and having a cone shape; a plurality of holding parts on the front surface of the horizontal part, each of the plurality of holding parts holding a lamp; at least one coupling part extending from a rear surface of the horizontal part and having a trident shape; and a plurality of ribs protruding from the rear surface of the horizontal part and corresponding to the plurality of holding parts.

10 Claims, 4 Drawing Sheets

BACKLIGHT UNIT AND LIQUID CRYSTAL DISPLAY DEVICE INCLUDING THE SAME

This application claims the benefit of Korean Patent Application No. 2008-0039274, filed on Apr. 28, 2008, which is hereby incorporated by reference for all purposes as if fully set forth herein.

BACKGROUND OF THE INVENTION

1. Field of the Invention

The present invention relates to a backlight unit for a liquid crystal display (LCD) device, and more particularly, to a lamp guide, a backlight unit including the lamp guide and a liquid crystal display device including the backlight unit.

2. Discussion of the Related Art

Although cathode-ray tubes (CRTs) have been widely used as a display device for a television, a measuring instrument or an information terminal, it is hard to apply the CRTs to reduced electronic products in size and weight because of their heavy weight and large volume. Recently, flat panel display (FPD) such as liquid crystal display (LCD) devices and plasma display panels (PDPs) have been the subject of research and development because of their superior thin profile and light weight as compared with the CRTs.

LCD devices include a liquid crystal panel having opposite two substrates and a liquid crystal layer between the two substrates. After first and second substrates, which include an array element and a color filter layer, respectively, are formed through repetition of a thin film deposition step, a photolithographic step and an etching step, a seal pattern is formed on one of the first and second substrates. The first and second substrates may be referred to as an array substrate and a color filter substrate, respectively. Next, the first and second substrates are attached, and the liquid crystal layer is formed between the first and second substrates to complete the liquid crystal panel. After polarizing plates and a driving circuit unit are attached to the liquid crystal panel, the liquid crystal panel constitutes the LCD device with a backlight unit.

Since the LCD device is a non-emissive display device that displays images using an external light, the LCD device includes a backlight unit under the liquid crystal panel as an additional light source. The backlight unit is classified into an edge type and a direct type according to a position relation between the liquid crystal panel and a lamp of the backlight unit. Since the direct type backlight unit has no limit according to a display size of the liquid crystal panel, the direct type backlight unit has been widely used for an LCD device having a size over about 30 inches. The direct type backlight unit does not require a light guide plate (LGP) reflecting and refracting the light. In addition, the direct type backlight unit includes a plurality of lamps, a reflecting plate and a plurality of optic means. The plurality of lamps parallel spaced apart from each other are disposed under the liquid crystal panel. The reflecting plate reflects the light from the plurality of lamps toward the liquid crystal panel and the plurality of optic means are disposed over the plurality of lamps.

In the direct type backlight unit, as the liquid crystal panel is enlarged, each lamp is also elongated. Accordingly, a lamp guide fixing and supporting each lamp is required. FIG. 1 is a cross-sectional view showing a liquid crystal display device including a direct type backlight unit according to the related art. In FIG. 1, a liquid crystal panel 45 and a backlight unit 50 are integrated in an LCD device 1 by mechanical elements. Accordingly, the LCD device 1 includes the liquid crystal panel 45, the backlight unit 50, a bottom frame 15, a main frame 60 and a top frame 70. The liquid crystal panel 45 is disposed over the backlight unit 50, and the main frame 60 surrounds side surfaces of the liquid crystal panel 45 and the backlight unit 50. The top frame 70 surrounds a front edge surface of the liquid crystal panel 45, and the bottom frame 15 wraps a rear surface of the backlight unit 50. The top frame 70 and the bottom frame 15 are combined through the main frame 60.

The liquid crystal panel 45 includes a first substrate 45a, a second substrate 45b and a liquid crystal layer (not shown) between the first and second substrates 45a and 45b. Although not shown in FIG. 1, a driving circuit is connected to a side of the liquid crystal panel 45 and is bent toward a rear of the liquid crystal panel 45.

The backlight unit 50 includes a reflecting sheet 20, a plurality of lamps 25 and a plurality of optic sheets 35. The reflecting sheet 20 has a white color or a silver color and is disposed over the bottom frame 15. For example, the reflecting sheet 20 may include aluminum (Al). The plurality of lamps 25 are parallel arranged over the reflecting sheet 20, and the plurality of optic sheets 35 cover the plurality of lamps 25. For example, the plurality of lamps 25 may include a cold cathode fluorescent lamp (CCFL). In addition, the plurality of optic sheets 35 may include a prism sheet, a diffusing sheet and a protecting sheet. As a result, lights emitted from the plurality of lamps 25 and reflected on the reflecting sheet 20 are supplied to the liquid crystal panel 45 through the plurality of optic sheets 35. The brightness of the lights becomes uniform while passing through the plurality of optic sheets 35.

Although not shown in FIG. 1, the plurality of lamps 25 may be fixed and supported by a side supporter at both ends thereof. In a direct type backlight unit, as the liquid crystal panel 45 is enlarged, each lamp 25 is elongated. Accordingly, a lamp guide fixing and holding each lamp 25 is formed at intermediate portions between the both ends thereof to prevent a droop or a warpage of each lamp 25 at the intermediate portions.

FIG. 2 is a cross-sectional view showing a direct type backlight unit of a liquid crystal display device according to the related art. In FIG. 2, a reflecting sheet 20 and a lamp guide 40 are sequentially disposed over a bottom frame 15. The bottom frame 15 includes a plurality of first through holes TH1 and the reflecting sheet 20 includes a plurality of second through holes TH2 corresponding to the plurality of first through holes TH1. The lamp guide 40 is coupled with the bottom frame 15 through the plurality of first through holes TH1 and the plurality of second through holes TH2. A plurality of lamps 25 are hold and fixed by the lamp guide 40 and a plurality of optic sheets 35 are disposed over the plurality of lamps 25.

The lamp guide 40 includes a horizontal part 42, a supporting part 44, a plurality of holding part 46 and first and second coupling parts 47 and 48. Since the supporting part 44 having a cone shape upwardly extends from a front surface of the horizontal part 42 to support the plurality of optic sheets 35, the distance between each lamp 25 and the plurality of optic sheets 35 is kept uniform. The plurality of holding parts 46 are formed on the front surface of the horizontal part 42, and each holding part 46 holds and fixes each lamp 25. In addition, each holding part 46 has a ring shape having an open portion and may include an elastic material such as a plastic to hold each lamp 25 strongly.

Each of the first and second coupling parts 47 and 48 downwardly extends from a rear surface of the horizontal part 42. For example, each of the first and second coupling parts 47 and 48 may have a trident shape having a hanging portion and may include an elastic material such as a plastic. Accordingly, after each of the first and second coupling parts 47 and 48 is inserted through the first and second through holes TH1 and TH2, the lamp guide 40 is strongly coupled with the reflecting sheet 20 and the bottom frame 15 due to the elastic hanging portion.

The procedure of coupling the bottom frame 15, the reflecting sheet 20, the lamp guide 40 and the plurality of lamps 25 will be illustrated hereinafter. After the bottom frame 15 is aligned to the reflecting sheet 20 such that the plurality of first through holes TH1 correspond to the plurality of second through holes TH2, each of the first and second coupling means 47 and 48 of the lamp guide 40 is inserted into the first and second through holes TH1 and TH2 to couple the lamp guide 40 with the reflecting sheet 20 and the bottom frame 15. In addition, each of the plurality of lamps 25 is inserted into each of the plurality of holding parts 46 of the lamp guide 40 coupled with the reflecting sheet 20 and the bottom frame 15.

The horizontal part 42 of the lamp guide 40 is spaced apart from the reflecting sheet 20 by a gap G to prevent deterioration of the reflecting sheet 20 such as a scratch due to the lamp guide 40. For example, the gap may be within a range of about 0.5 mm to about 1 mm. Accordingly, when the plurality of lamps 25 are inserted into the plurality of holding parts 46, the horizontal part 42 of the lamp guide 40 may be pressed down and may be warped in the gap G to contact the reflecting sheet 20. The deformation such as a warpage of the horizontal part 46 may cause damage such as a crack to each lamp 25, and the contact between the horizontal part 42 and the reflecting sheet 20 may cause deterioration such as a scratch of the reflecting sheet 20. As a result, production efficiency is reduced to prevent the warpage or the contact.

In addition, the reflecting sheet 20 may be formed of a micro cellular polyethylene terephthalate (MCPET) having a thickness of about 0.6 mm to about 1 mm. Although the reflecting sheet 20 of MCPET has a relatively high reflectance, the reflecting sheet 20 of MCPET has a disadvantage of a relatively high cost. Accordingly, a reflecting sheet 20 having a reduced thickness of about 0.2 mm to about 0.3 mm has been researched and developed. Although the reflecting sheet 20 of the reduced thickness has no problem under a temperature of about 10° C. to about 30° C., the reflecting sheet 20 of the reduced thickness may be deteriorated under a relatively low temperature or under a relatively high temperature. For example, the reflecting sheet 20 of the reduced thickness may have a warpage or a wrinkle. However, since the horizontal part 42 of the lamp guide 40 is spaced apart from the reflecting sheet 20 of the reduced thickness, the lamp guide 40 does not press down the deteriorated portion of the reflecting sheet 20 under the relatively low temperature or under the relatively high temperature. As a result, the effective reflectance of the reflecting sheet 20 is reduced due to scattering at the deteriorated portion or the lamp guide 40 contacts the deteriorated portion of the reflecting sheet 20 to generate a defect in the reflecting sheet 20.

SUMMARY

Accordingly, the present invention is directed to a lamp guide and a liquid crystal display device including the lamp guide that substantially obviate one or more of the problems due to limitations and disadvantages of the related art.

An advantage of the present invention is to provide a backlight unit where deterioration of a lamp guide and a reflecting sheet is prevented.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lamp guide includes: a horizontal part; at least one supporting part extending from a front surface of the horizontal part and having a cone shape; a plurality of holding parts on the front surface of the horizontal part, each of the plurality of holding parts holding a lamp; at least one coupling part extending from a rear surface of the horizontal part and having a trident shape; and a plurality of ribs protruding from the rear surface of the horizontal part and corresponding to the plurality of holding parts.

In another aspect of the present invention, a backlight unit includes: a reflecting sheet; a plurality of lamps over the reflecting sheet; a plurality of lamp guides, each including: a horizontal part; at least one supporting part extending from a front surface of the horizontal part and having a cone shape; a plurality of holding parts on the front surface of the horizontal part, each of the plurality of holding parts holding each of the plurality of lamps; at least one coupling part extending from a rear surface of the horizontal part and having a trident shape; and a plurality of ribs protruding from the rear surface of the horizontal part and corresponding to the plurality of holding parts; a pair of side supporters fixing and supporting opposite end portions of each the plurality of lamps; and a plurality of optic sheets over the plurality of lamps.

In another aspect of the present invention, a liquid crystal display device includes: a bottom frame having a plurality of first through holes; a reflecting sheet over the bottom frame, the reflecting sheet having a plurality of second through holes corresponding to the plurality of first through holes; a plurality of lamps over the reflecting sheet; a plurality of lamp guides, each including: a horizontal part; at least one supporting part extending from a front surface of the horizontal part and having a cone shape; a plurality of holding parts on the front surface of the horizontal part, each of the plurality of holding parts holding each of the plurality of lamps; at least one coupling part extending from a rear surface of the horizontal part and having a trident shape, the at least one coupling part coupled with the bottom frame through the plurality of first through holes and the plurality of second through holes; and a plurality of ribs protruding from the rear surface of the horizontal part and corresponding to the plurality of holding parts; a pair of side supporters fixing and supporting opposite end portions of each the plurality of lamps; a plurality of optic sheets over the plurality of lamps; a liquid crystal panel over the plurality of optic sheets; a main frame surrounding a side surface of the liquid crystal panel; and a top frame surrounding a front edge surface of the liquid crystal panel, wherein the top frame and the bottom frame are combined through the main frame.

It is to be understood that both the foregoing general description and the following detailed description are exemplary and explanatory and are intended to provide further explanation of the invention as claimed and together with the description serve to explain the principles of the invention.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts.

Figure 1:
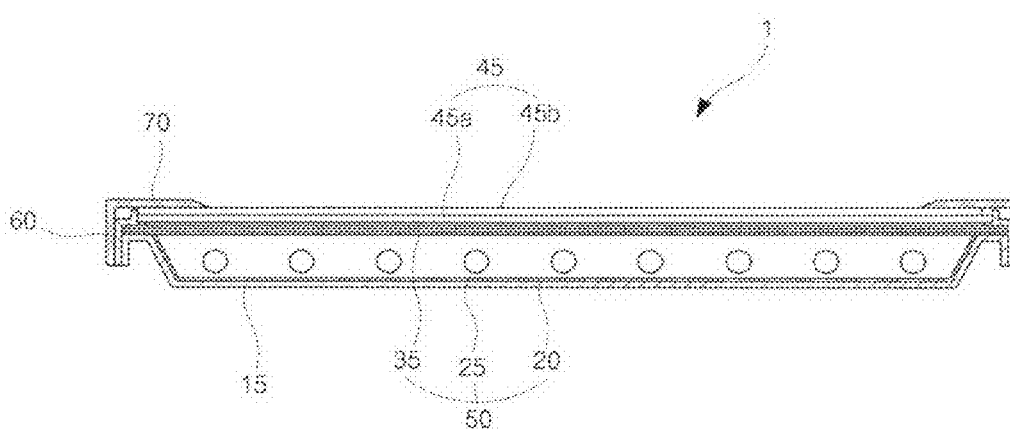
FIG. 1 is a cross-sectional view showing a liquid crystal display device including a direct type backlight unit according to the related art.
Figure 2:
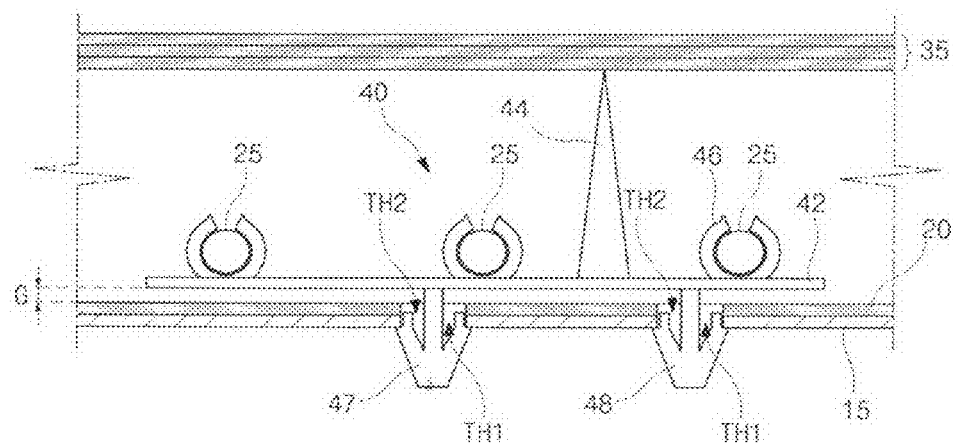
FIG. 2 is a cross-sectional view showing a direct type backlight unit of a liquid crystal display device according to the related art.
Figure 3:
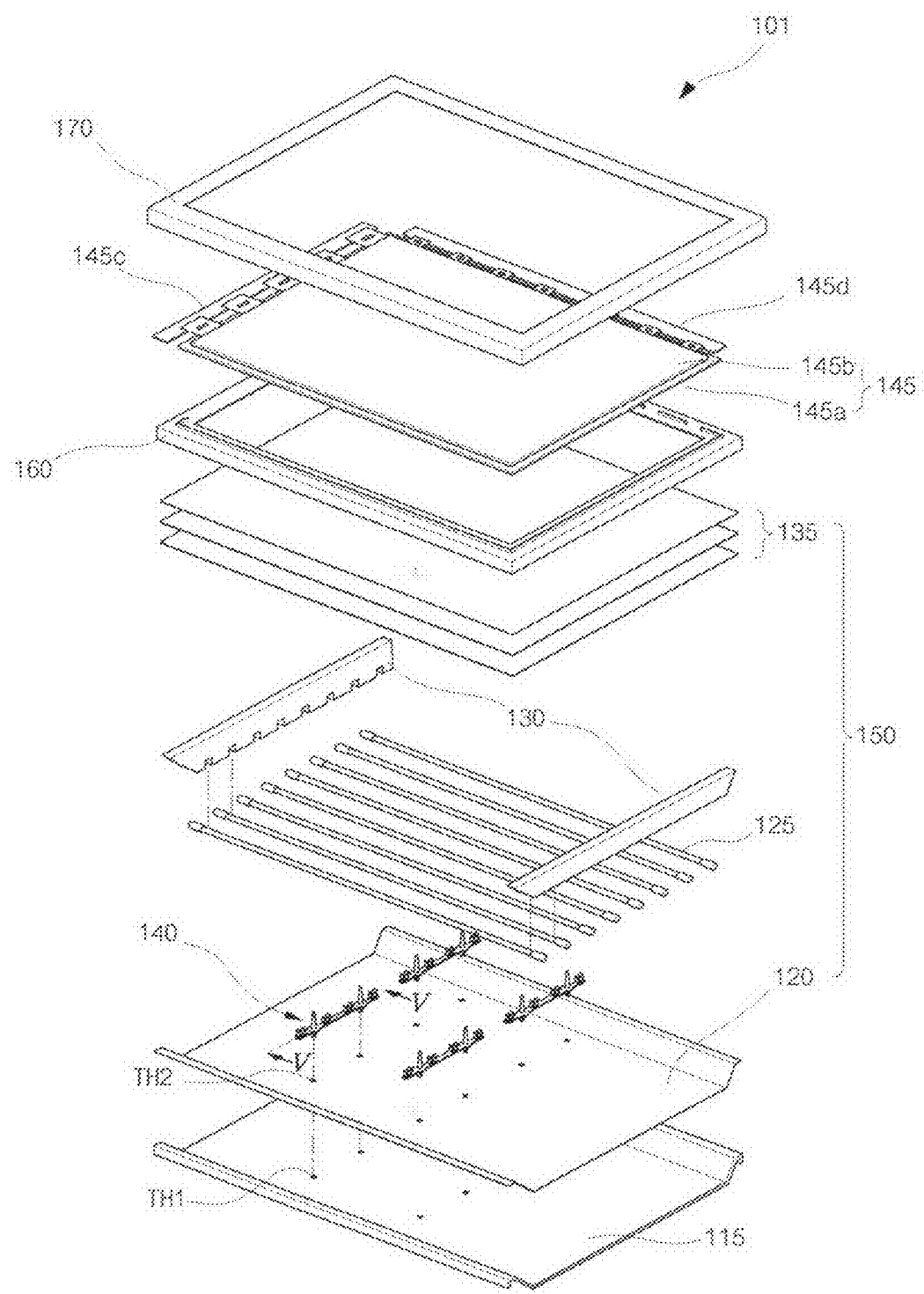
FIG. 3 is an exploded perspective view showing a liquid crystal display device according to a first embodiment of the present invention.

FIG. 3 is an exploded perspective view showing a liquid crystal display device according to a first embodiment of the present invention.

In FIG. 3, a liquid crystal display (LCD) device 101 includes a bottom frame 115, a backlight unit 150, a liquid crystal panel 145, a main frame 160 and a top frame 170. The backlight unit 150 and the liquid crystal panel 145 are sequentially disposed over the bottom frame 115, and the main frame 160 surrounds side surfaces of the backlight unit 150 and the liquid crystal panel 145. The top frame 170 surrounds a front edge surface of the liquid crystal panel 145, and the bottom frame 115 wraps a rear surface of the backlight unit 150. The top frame 170 and the bottom frame 115 are combined through the main frame 160.

The bottom frame includes a plurality of first through holes TH1. The backlight unit 150 supplies light to the liquid crystal panel 145. The backlight unit 150 includes a reflecting sheet 120, a plurality of lamp guides 140, a plurality of lamps 125, a pair of side supporters 130 and a plurality of optic sheets 135. The reflecting sheet 120 is disposed over the bottom frame 115 and includes a plurality of second through holes TH2 corresponding to the plurality of first through holes TH1. For example, the reflecting sheet 120 may include aluminum (Al). The plurality of lamps 125 are parallel to and spaced apart from each other over the reflecting sheet 120. In addition, the pair of side supporters 130 fix and support opposite end portions of each of the plurality of lamps 125, and the plurality of lamp guides 140 fix and hold intermediate portions of each of the plurality of lamps 125. For example, the plurality of lamps may include one of a cold cathode fluorescent lamp (CCFL), a hot cathode fluorescent lamp (HCFL) and an external electrode fluorescent lamp (EEFL).

The plurality of optic sheets 135 are disposed over the plurality of lamps 125, and may include a diffusing sheet, a prism sheet and a protecting sheet for improve an efficiency of the light from the plurality of lamps 125. As a result, the light emitted from the plurality of lamps 125 and reflected on the reflecting sheet 120 is supplied to the liquid crystal panel 145 through the plurality of optic sheets 135, and brightness of the light becomes uniform while passing through the plurality of optic sheets 135.

The liquid crystal panel 145 includes a first substrate 145a, a second substrate 145b4 and a liquid crystal layer (not shown) between the first and second substrates 145a and 145b. Although not shown in FIG. 3, a gate line and a data line are formed on an inner surface of the first substrate 145a, which is referred to as a lower substrate or an array substrate. The gate line crosses the data line to define a pixel region, and a thin film transistor (TFT) is connected to the gate line and the data line. A pixel electrode connected to the TFT is formed in the pixel region. In addition, a black matrix and a color filter layer are formed on an inner surface of the second substrate 145b, which is referred to as an upper substrate or a color filter substrate. The black matrix corresponds to the gate line, the data line and the TFT. The color filter layer includes red, green and blue color filters each corresponding to the pixel region. A common electrode is formed on the black matrix and the color filter layer.

A gate driving unit 145c and a data driving unit 145d are connected to adjacent two sides of the liquid crystal panel 145 through a tape carrier package (TCP) or a flexible printed circuit board (FPC). The gate driving unit 145c sequentially applies an on/off signal for the TFT to the gate line, and the data driving unit 145d applies an image signal to the data line in each frame. The gate and data driving units 145c and 145d are bent toward a side surface of the main frame 160 or a rear surface of the bottom frame 115. Accordingly, when the TFT connected to the gate line is turned on by the on/off signal of the gate driving unit 145c, the image signal of the data driving unit 145d is supplied to the pixel electrode. The liquid crystal layer is rearranged by the electric field generated between the pixel electrode and the common electrode, and the transmittance of the liquid crystal layer is adjusted.

Each of the plurality of lamp guides 140 is coupled with the reflecting sheet 120 and the bottom frame 115 through the plurality of first through holes TH1 and the plurality of second through holes TH2.

Figure 4:
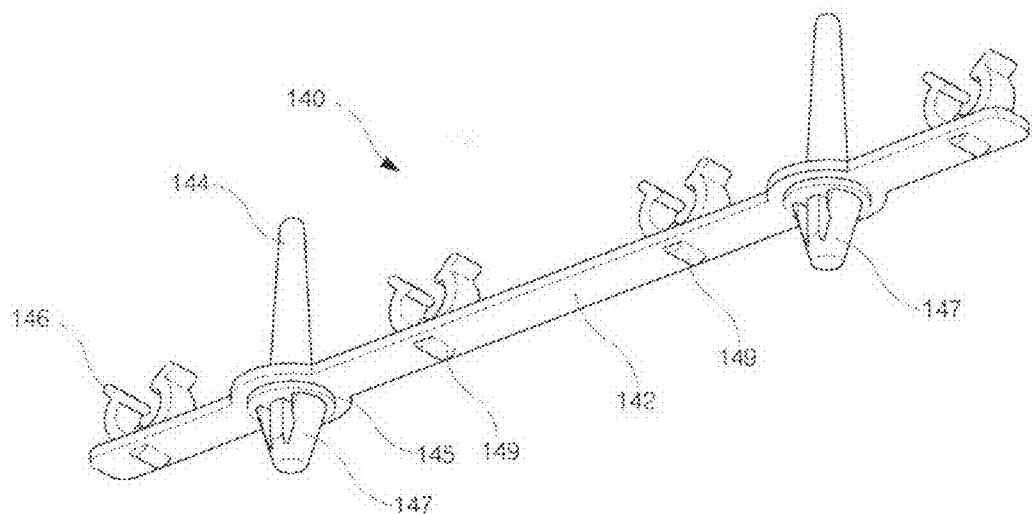
FIG. 4 is a perspective view showing a lamp guide of a backlight unit according to a first embodiment of the present invention.
Figure 5:
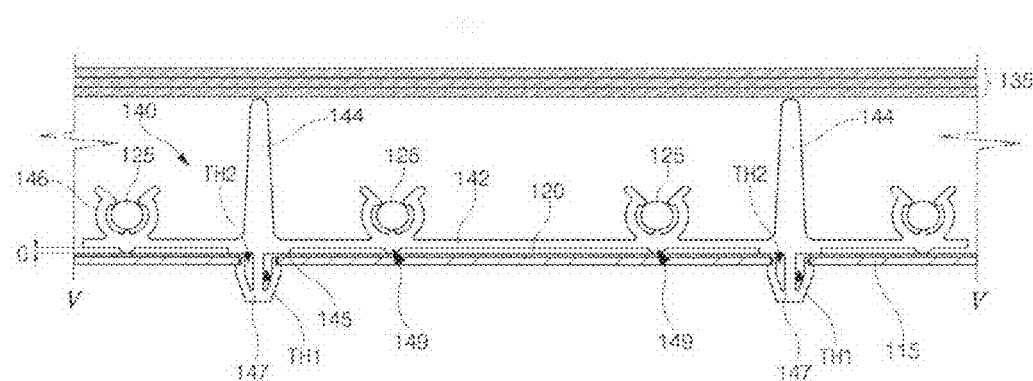
FIG. 5 is a cross-sectional view, which is taken along a ling V-V of FIG. 3, showing a backlight unity according to a first embodiment of the present invention.

FIG. 4 is a perspective view showing a lamp guide of a backlight unit according to a first embodiment of the present invention, and FIG. 5 is a cross-sectional view, which is taken along a ling V-V of FIG. 3, showing a backlight unity according to a first embodiment of the present invention.

In FIGS. 4 and 5, the reflecting sheet 120 and the lamp guide 140 are sequentially disposed over the bottom frame 115. The bottom frame 115 includes a plurality of first through holes TH1 and the reflecting sheet 120 includes a plurality of second through holes TH2 corresponding to the plurality of first through holes TH1. The lamp guide 140 is coupled with the bottom frame 115 through the plurality of first through holes TH1 and the plurality of second through holes TH2. The plurality of lamps 125 are hold and fixed by the lamp guide 140 and the plurality of optic sheets 135 are disposed over the plurality of lamps 125.

The lamp guide 140 includes a horizontal part 142, at least one supporting part 144, a plurality of holding part 146, at least one base part 145, at least one coupling part 147 and a plurality of ribs 149. Since the at least one supporting part 144 having a cone shape upwardly extends from a front surface of the horizontal part 142 to contact and support the plurality of optic sheets 135, the distance between each lamp 125 and the plurality of optic sheets 135 is kept uniform. The plurality of holding parts 146 are formed on the front surface of the horizontal part 142, and each holding part 146 holds and fixes each lamp 125. In addition, each holding part 146 has a ring shape having an open portion and may include an elastic material such as a plastic to hold each lamp 125 strongly. Further, a plurality of protrusions may be formed on an inner surface of the ring shape of each holding part 146.

The at least one coupling part 147 downwardly extends from a rear surface of the horizontal part 142, and the at least one base part 145 is formed between the horizontal part 142 and the at least one coupling part 147. For example, the at least one coupling part 147 may have a trident shape having a hanging portion and may include an elastic material such as a plastic. In addition, a radius of the at least one base part may be greater than a radius of the second through hole TH2. Accordingly, after each of the at least one coupling parts 147 is inserted through the first and second through holes TH1 and TH2, the lamp guide 140 is strongly coupled with the reflecting sheet 120 and the bottom frame 115 due to the elastic hanging portion.

The plurality of ribs 149 protrude from the rear surface of the horizontal part 142 and correspond to the plurality of holding parts 146. For example, each of the plurality of ribs 149 may have a half cylinder shape and may be integrated with the horizontal part 142. The at least one base part 145 has substantially the same height as each of the plurality of ribs 149. As a result, each of the at least one base part 145 and the plurality of ribs 149 has a height corresponding to a gap G between the horizontal part 142 and the reflecting sheet 120 to contact and support the reflecting sheet 120. Accordingly, the horizontal part 142 of the lamp guide 140 is spaced apart from the reflecting sheet 120 by the gap G due to the at least one base part 145 and the plurality of ribs 149 to prevent deterioration of the reflecting sheet 120 such as a scratch by the lamp guide 140.

The procedure of coupling the bottom frame 115, the reflecting sheet 120, the lamp guide 140 and the plurality of lamps 125 will be illustrated hereinafter. After the reflecting sheet 120 is aligned to the bottom frame 115 such that the plurality of first through holes TH1 correspond to the plurality of second through holes TH2, the at least one coupling means 147 of the lamp guide 140 is inserted into the first and second through holes TH1 and TH2 to couple the lamp guide 140 with the reflecting sheet 120 and the bottom frame 115.

In addition, each of the plurality of lamps 125 is inserted into each of the plurality of holding parts 146 of the lamp guide 140 coupled with the reflecting sheet 120 and the bottom frame 115. Since the gap G between the lamp guide 140 and the reflecting sheet 120 is kept by the at least one base part 145 and the plurality of ribs 149, the horizontal part 142 does not contact the reflecting sheet 120 and deterioration of the reflecting sheet 120 such as a scratch is prevented even when the horizontal part 142 is pressed down by insertion step of the plurality of lamps 125 into the plurality of holding part 146. Furthermore, since the at least one base part 145 and the plurality of ribs 149 contact and press down the reflecting sheet 120, deterioration of the reflecting sheet 120 such as a warpage and a wrinkle is prevented under a relatively low temperature or under a relatively high temperature even when the reflecting sheet 120 having a reduced thickness of about 0.2 mm to about 0.3 mm is used. Moreover, since the at least one base part 145 and the plurality of ribs 149 contact and press down the reflecting sheet 120, movement of the reflecting sheet 120 is prevented.

Although the at least one coupling part 147 is disposed to correspond to the at least one supporting part 144 in FIGS. 4 and 5, the at least one coupling part 147 may be disposed alternately with the at least one supporting part 144 in another embodiment.

Figure 6:
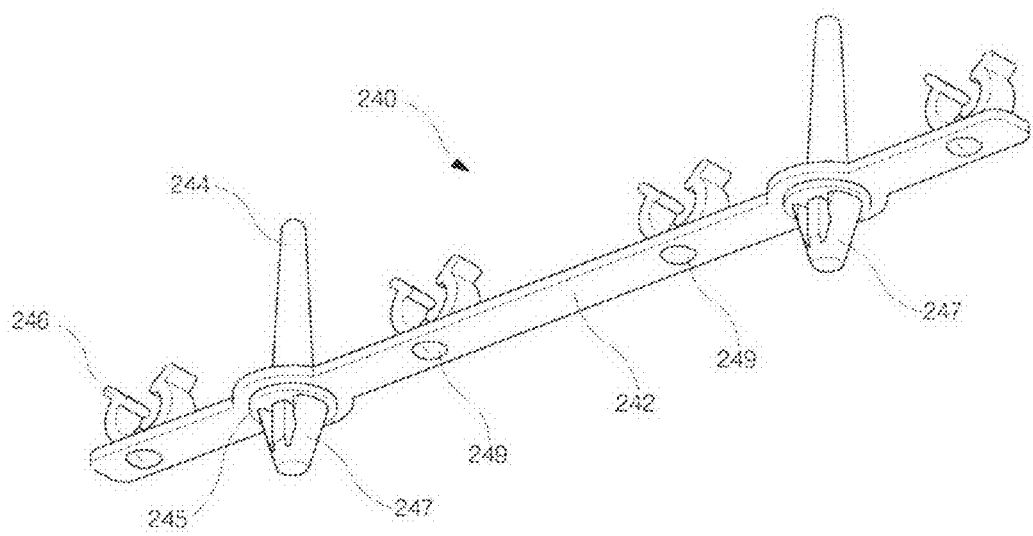
FIG. 6 is a perspective view showing a lamp guide of a backlight unit according to a second embodiment of the present invention.

FIG. 6 is a perspective view showing a lamp guide of a backlight unit according to a second embodiment of the present invention. Since the lamp guide of FIG. 6 has a structure similar to the lamp guide of FIG. 4, illustration regarding the same portions will be omitted.

In FIG. 6, a reflecting sheet 220 and a lamp guide 240 are sequentially disposed over a bottom frame 215. The lamp guide 240 includes a horizontal part 242, at least one supporting part 244, a plurality of holding part 246, at least one base part 245, at least one coupling part 247 and a plurality of ribs 249. Each of the plurality of ribs 249 may have a half sphere shape (hemispheric shape) and may be integrated with the horizontal part 242. Since the gap G between the lamp guide 240 and the reflecting sheet 220 is kept by the at least one base part 245 and the plurality of ribs 249, the horizontal part 242 does not contact the reflecting sheet 220 even when the horizontal part 242 is pressed down by insertion step of the plurality of lamps 225 into the plurality of holding part 246. In addition, deformation of the lamp guide 240 such as a warpage and deterioration of the reflecting sheet 220 such as a scratch are prevented. Furthermore, since the at least one base part 245 and the plurality of ribs 249 contact and press down the reflecting sheet 220, deterioration of the reflecting sheet 220 such as a warpage and a wrinkle is prevented under a relatively low temperature or under a relatively high temperature even when the reflecting sheet 220 having a reduced thickness of about 0.2 mm to about 0.3 mm is used. Moreover, since the at least one base part 245 and the plurality of ribs 249 contact and press down the reflecting sheet 220, movement of the reflecting sheet 220 is prevented.

In an LCD device including a backlight unit having a lamp guide according to the present invention, consequently, a gap between the lamp guide and the reflecting sheet is kept by the at least one base part and the plurality of ribs. As a result, deterioration of the reflecting sheet such as a scratch due to contact between the lamp guide and the reflecting sheet is prevented. In addition, deformation of the lamp guide causing the crack of the lamp is prevented. Further, deterioration of the relatively thin reflecting sheet such as a warpage and a wrinkle is prevented. Finally, movement of the reflecting sheet is also prevented.

It will be apparent to those skilled in the art that various modifications and variations can be made in a backlight unit and a liquid crystal display device including the backlight unit of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a bottom frame having a plurality of first through holes;
   a reflecting sheet over the bottom frame, the reflecting sheet having a plurality of second through holes corresponding to the plurality of first through holes;
   a plurality of lamps over the reflecting sheet;
   a plurality of lamp guides, each comprising:
   a horizontal part;
   at least one supporting part extending from a front surface of the horizontal part and having a cone shape;
   a plurality of holding parts on the front surface of the horizontal part, each of the plurality of holding parts holding each of the plurality of lamps;
   at least one coupling part extending from a rear surface of the horizontal part and having a trident shape, the at least one coupling part coupled with the bottom frame through a first through hole of the plurality of first through holes and a second through hole of the plurality of second through holes; and
   a plurality of ribs protruding from the rear surface of the horizontal part and corresponding to the plurality of holding parts;

a pair of side supporters fixing opposite end portions of each the plurality of lamps;

a plurality of optic sheets over the plurality of lamps;

a liquid crystal panel over the plurality of optic sheets;

a main frame surrounding a side surface of the liquid crystal panel; and a top frame surrounding a front edge surface of the liquid crystal panel, wherein the top frame and the bottom frame are combined through the main frame, wherein the reflecting sheet is spaced apart from the horizontal part by a gap.

2. The device according to claim 1, wherein the at least one supporting part contacts a single optical sheet and supports the plurality of optic sheets.

3. The device according to claim 1, wherein each of the plurality of ribs has one of a half cylinder shape and a half sphere shape.

4. The device according to claim 1, wherein the at least one coupling part corresponds to the at least one supporting part.

5. The device according to claim 1, wherein the plurality of ribs are integrated with the horizontal part.

6. The device according to claim 1, wherein each of the plurality of lamp guides further comprises at least one base part between the horizontal part and the at least one coupling part.

7. The device according to claim 6, wherein the at least one base part has substantially the same height as each of the plurality of ribs.

8. The device according to claim 7, wherein the plurality of ribs press down the reflecting sheet.

9. The device according to claim 1, wherein a height of each of the plurality of ribs corresponds to the gap.

10. The device according to claim 1, wherein the plurality of lamps include a lamp of a group consisting of a cold cathode fluorescent lamp (CCFL), a hot cathode fluorescent lamp (HCFL) and an external electrode fluorescent lamp (EEFL).

* * * * *